Feb. 7, 1961     O. W. BOUGHTON     2,971,080
MICROSCOPE ILLUMINATING DEVICE
Filed April 21, 1958

INVENTOR.
OLIN W. BOUGHTON
BY
ATTORNEYS

United States Patent Office

2,971,080
Patented Feb. 7, 1961

2,971,080

MICROSCOPE ILLUMINATING DEVICE

Olin W. Boughton, Canandaigua, N.Y., assignor to Bausch & Lomb Optical Company, Rochester, N.Y., a corporation of New York Filed Apr. 21, 1958, Ser. No. 729,781

4 Claims. (Cl. 240—2)

This invention relates to optical instruments and more particularly has reference to an illumination mounting device for use with a microscope.

An object of the invention is to provide an improved illumination mounting device which is readily adapted to support either a plurality of mirrors or an illumination source.

Another object of the invention is to provide simple and improved means for illuminating a specimen under microscopic examination wherein various illuminating devices may be substituted without necessitating dismantling of the mounting structure for these devices.

Other objects and advantages will become apparent from the following description taken in conjunction with the accompanying drawing, wherein.

Figure 1:
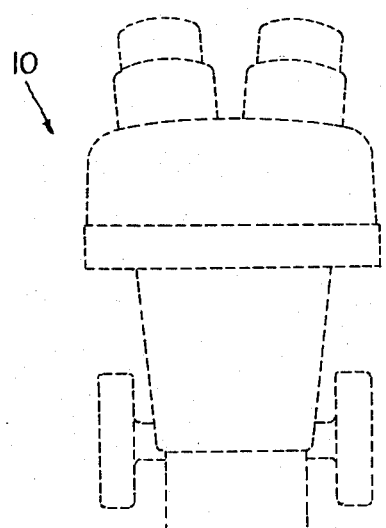
Fig. 1 is a cross-sectional view of the illumination mounting device of the present invention associated with a microscope base.
Figure 3:
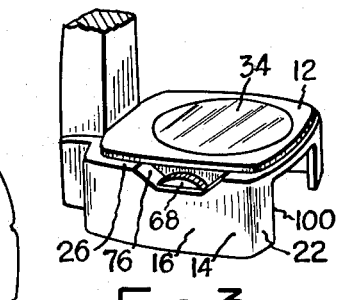
Fig. 3 is a perspective view of the frame which may serve as a base for a microscope and which houses the structure of the present invention.

Referring now to the drawing and more particularly to Figs. 1 and 3, there is shown a microscope 10 having a supporting base 12 therefor which may be mounted upon a single casting frame 14 by any suitable locking means. The frame 14, which serves as the housing for the present invention, is preferably made substantially parallelepiped in shape and includes side plates 16, 18, rear end wall 20, front end wall 22 and a horizontally and inwardly projecting flange 24 made integral with the sides, rear and front walls and upon which the base 12 may rest.

The side plates 16, 18 have thickened portions 26, 28, respectively, along their upper edges and the sections of the flange 24 which are integral with the side plates are relatively wide compared to the width of the flange at the front end wall. The top of the frame 14 is opened except for the flange 24, and the opening 30, as defined by the inner edge 32 of the flange, is made large enough to permit the transmission of light therethrough. Such light will impinge upon a suitable translucent glass plate 34 seated upon the base 12 and which may serve as a worktable for specimens to be observed by the microscope.

Depending from each of the thickened portions 26, 28 is a boss 36, 38, respectively, which are positioned approximately midway between the end and front plates of the frame 14. Formed in the lower sections of the bosses 36, 38 are grooves 40, 42, respectively, which have their axes in alignment and extending between the side walls 16, 18. A shaft 44 is positioned within the groove 40 and rotatably retained therein by a pair of spring members 46 bridged across the groove 40 and secured to the boss 36 by a screw 48. Similarly, a shaft 50 is positioned within the groove 42 and rotatably retained therein by a pair of spring members 52 bridged across the groove 42 and secured to the boss 38 by screws 54.

As shown in Fig. 1, the shafts 44 and 50 project inwardly of the frame 14 and are adapted to pivotally support a microscope mirror arrangement 56 therebetween. Each of the shafts is formed, at its inner ends, with a rounded tip 58, of reduced diameter, and a pair of locking projections 60 which are arranged in diametrically opposed positions on the shafts adjacent the tip 58 but cut back slightly therefrom. The tips 58 are adapted to be received in corresponding recesses 62 formed in a mounting ring 64 of the mirror arrangement 56 and the projections 60 are adapted to be received in corresponding slots 66 also formed on the ring 64 on either side of the recess 62. It will be apparent that when the shafts 44, 50 are moved axially outwardly slightly in order to remove the projection 60 from the grooves 66, but still permitting the tips 58 to remain in the recess 62, the mounting ring may be rotated in either direction relative to the shafts about the tips 58 which serve as pivot points for this rotation. When the shafts 44, 50 are moved inwardly in order to position the projections 60 within their respective slots 66, the ring 64 is locked against rotation relative to the shafts. However, the rotation of the ring 64 may be accomplished simply by rotating either or both shafts 44, 50 as will be described hereinafter.

Figure 4:
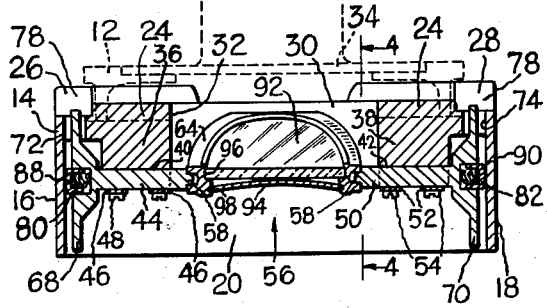
Fig. 4 is a section of the device on the line 4—4 of Fig. 1.
Figure 4:
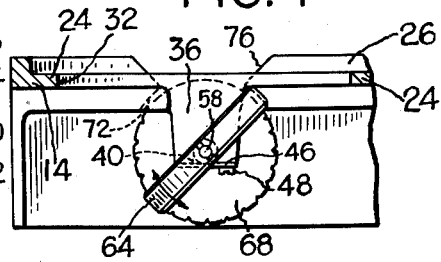
Figure 2:
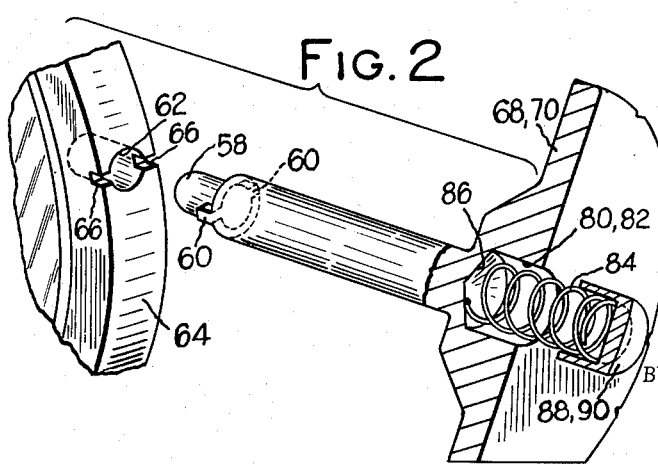
Fig. 2 is a fragmentary exploded view, partly in section, of a detail of the present invention.

Selective rotation of the shafts 44, 50 is accomplished by means of knobs 68, 70 retained within the frame 14 and integrally formed on the shafts 44, 50, respectively. The knobs 68, 70 are relatively thin at and adjacent their peripheries which are adapted to project through slots 72, 74 formed in the thickened portions 26, 28 of the side walls 16, 18, respectively. As shown in Figs. 1, 3 and 4, the thickened portions 26, 28, adjacent the slots are recessed at 76, 78 for permitting the exposure of the upper peripheral portions of the knobs and thereby allowing manual manipulation of the knobs from without the frame 14. In operation, either knob may be rotated to effect the rotation of the mirror mounting ring 64 to a desired angle with respect to a suitable light source and the objective of the microscope.

In order to normally lock the shafts 44, 50 to the ring 64, each of the knobs 68, 70 is formed with a recess 80, 82, respectively, which have their axes in line with the axes of the shafts. A spring 84 is held in compression within each of the recesses 80, 82 between the end walls 86 thereof and spring retaining caps 88, 90, respectively. The cap 88 is adapted to be slidably received within the recess 80 and is held from being extracted entirely from the recess by the interior surface of the side wall 16. The end of the cap 88 is slightly curved so that the same may pivot about its axis upon rotation of the shaft 44. Similarly, the cap 90 is free to slide within the recess 82 and abut the interior surface of the wall 18. The clearance spaces between each of the knobs 68, 70 and their adjacent side walls are sufficient first, to allow the removal of the projections 60 from their corresponding slots 66, and second, the removal of the tips 58 from the recesses 62 when the knobs are moved against the bias of the springs 84 and into engagement with the side walls. Normally, the spring 84 will bias the knobs 68, 70 inwardly in order to effect locking of the mounting ring 64 to the shafts 44, 50. In order to remove the mounting ring 64 from the frame 14, both knobs 68, 70 may be manually moved outwardly along the axes thereof until the tips 58 are free of their corresponding recesses 62 whereupon the mounting ring will be free of all supporting structure.

In Fig. 1, it will be noted that the ring 64 has mounted therein two mirrors 92, 94 positioned back to back and within suitable grooves 96, 98, respectively. The mirror 92 is of the plano type and the mirror 94 is of the concavo type, both serving different purposes as a reflector of a light source. Either mirror may be positioned in reflecting condition for the microscope 10 by simply rotating the mounting ring 64 until a desired angle between the plane of either mirror and the plane of the opening 30 is attained. Fine adjustments of either of the mirrors will be attained by fine manipulation of the knobs.

Figure 5:
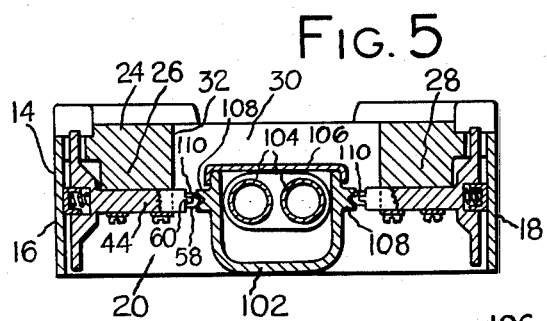
Fig. 5 is a cross-sectional view of the illuminating mounting device showing another adaptation of an illuminating means.
Figure 6:
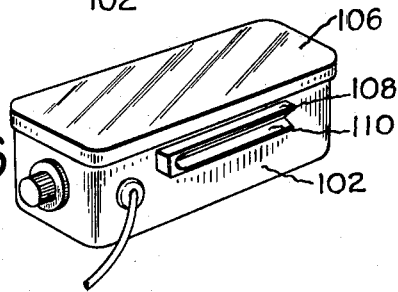
Fig. 6 is a perspective view of an illuminator which may be incorporated into the device shown in Fig. 5.

In the event a light source is desired to be directly associated with the microscope 10 without the aid of reflecting surfaces such as the mirrors 92, 94, the mounting ring 64 may be dismounted from the shafts 44, 50, as described above, and a light source slid within the frame 14 through an opening 100 formed in the front wall 22. Such an arrangement is shown in Figs. 5 and 6 wherein there is shown a light source housing 102 positioned beneath, and resting upon the same support as the frame 14. The housing 102 includes a suitable light source 104 mounted therein and a light diffusing glass plate 106 as a top wall thereof. The housing 102 is provided with blocks 108 one on each of the sides thereof and each of the blocks has a groove 110 formed longitudinally thereon. The grooves are adapted to cooperate with the tips 58 of the shafts 44, 50 in order to maintain the housing in position with respect to the frame 14. In this arrangement, the distance between the bottom of the grooves 110 is such as to require outwardly axial movement of the shafts 44, 50 in order to permit the insertion of the tips 58 within the grooves. In this manner, there will be an inward force exerted on each of the shafts by the springs 84 in order to maintain positioning of the housing with respect to the opening 30.

I claim:

1. An illuminating device for a microscope comprising a base having two side walls and a top wall having an opening, a pair of aligned rotatable shafts supported on and extending inwardly from the respective side walls with the inner ends of the shafts in spaced relation to each other, an optical member arranged below the opening and between said ends, said member having recesses for receiving said ends of said shafts, spring means for biasing said shafts inwardly and urging them into said recesses for maintaining said member in a position for directing light through said opening, each of said last named means including a spring held in compression between one of said walls and one end of the shaft associated therewith for biasing said shaft inwardly, and detent means for preventing relative rotation between said member and said shafts while said member is supported on said shafts.

2. In an illuminating means for a microscope comprising a base provided with two side walls and a top wall having an opening, a pair of aligned shafts extending inwardly from the respective side walls with the inner ends of the shafts in spaced relation to each other, a mounting ring for a mirror arranged below the opening and between said ends, said ring having recesses for receiving said ends of said shafts, manually operable means connected to at least one of said shafts for rotating the same, and means associated with each of said shafts for biasing the same inwardly along their axes whereby said ends are forced into said recesses for maintaining said ring in a position for directing light through said opening, each of said last-named means including a spring held in compression between one of said walls and one end of the shaft assoicated therewith for biasing said shaft inwardly.

3. In an illuminating means for a microscope comprising a base provided with two side walls and a top wall having an opening, a pair of rotatable aligned shafts extending inwardly from the respective side walls with the inner ends of the shafts in spaced relation to each other, a mounting ring for a mirror arranged below the opening and between said ends, said ring having recesses for receiving said ends of said shafts, means associated with each of said shafts for biasing the same inwardly along their axes whereby said ends are forced into said recesses for supporting said ring, means for locking said ring against relative rotation with respect to said shafts, and means for rotating each of said shafts for effecting rotation of said ring about said longitudinal axes and thereby vary the angle between the plane of the opening and the plane of the mirror.

4. An illuminating device for a microscope or the like comprising a base having front and top openings, a pair of horizontal shafts rotatably mounted on said base beneath the top opening thereof and in coaxial alignment with each other for supporting an optical element beneath said top opening and behind said front opening for rotation about a horizontal axis, releasable detent means for locking the optical element against rotation relative to said shafts when it is supported thereon, spring means for urging said shafts towards each other, and manual actuators fixed to said shafts and projecting from said base for rotating said shafts thereby to rotate an optical element supported by said shafts and for retracting said shafts against the urging of said springs to release said detent means and the element.

References Cited in the file of this patent

UNITED STATES PATENTS

| | | |
|---|---|---|
| 919,426 | Davis et al. | Apr. 27, 1909 |
| 1,232,729 | Starn | July 10, 1917 |
| 1,727,618 | Rife | Sept. 10, 1929 |
| 2,329,897 | Heinicke | Sept. 21, 1943 |
| 2,503,076 | Smith | Apr. 4, 1950 |
| 2,624,236 | Kirkpatrick et al. | Jan. 6, 1953 |
| 2,691,918 | Robins et al. | Oct. 19, 1954 |